July 24, 1962 E. W. CHILDERS 3,045,699
INTERMITTENT MISTING CONTROL APPARATUS
Filed Oct. 9, 1959
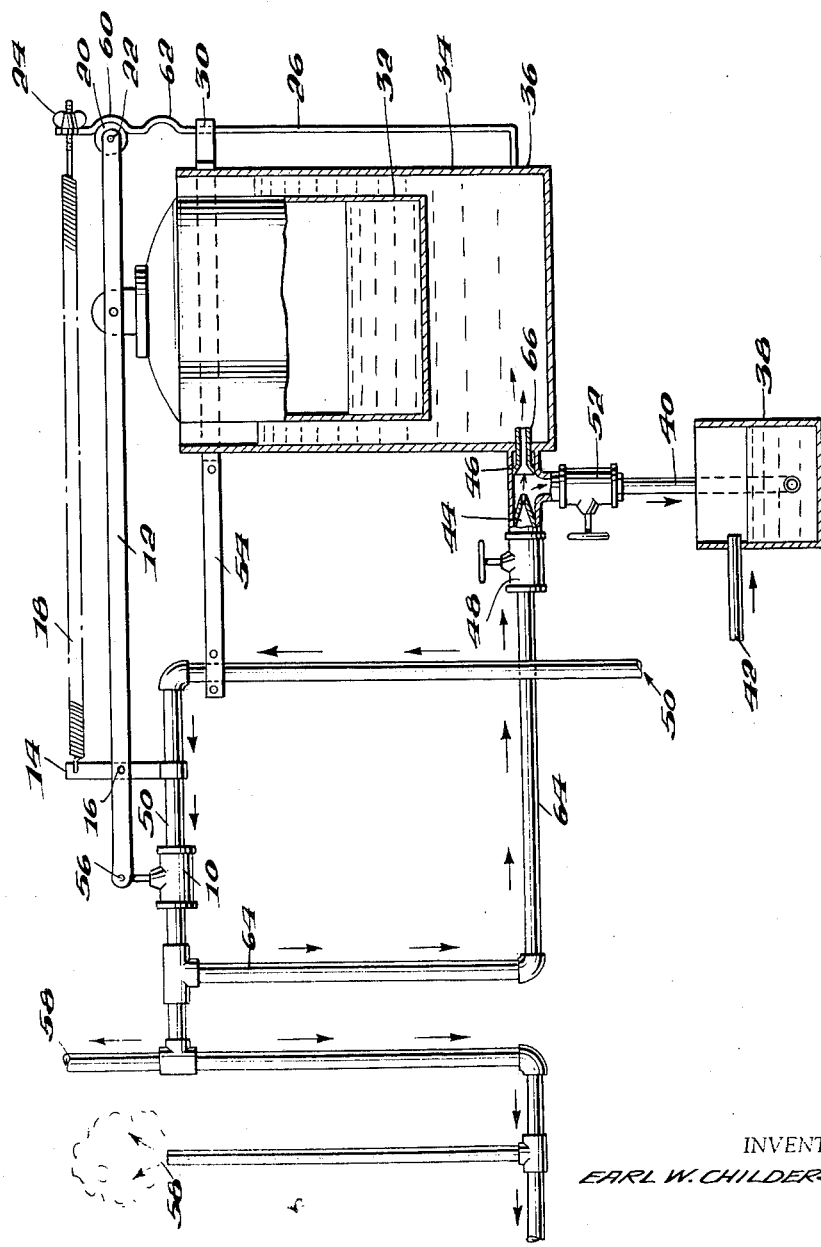
INVENTOR
EARL W. CHILDERS,
BY John Gibson Semmes,
ATTORNEYS

United States Patent Office 3,045,699
Patented July 24, 1962

3,045,699
INTERMITTENT MISTING CONTROL APPARATUS
Earl W. Childers, 2506 S. 29th St., Ashland, Ky.
Filed Oct. 9, 1959, Ser. No. 845,438
2 Claims. (Cl. 137—624.14)

The present invention relates to an apparatus for use in misting growing plants, concrete, treated surfaces and the like, particularly an apparatus for control of the intervals between mistings as well as the duration of each misting.

There are marketed and have been patented numerous devices for control of intermittent misting systems. One such device is that described in U.S. Patent No. 2,440,006 for Intermittent Flow Device. Shortcomings of such devices relate principally to the complexity of their control features, the volumes of water which must be expended for control, the inaccessibility of adjustment features and their incapability to provide sustained misting action.

The present control apparatus is characterized by its simplicity of moving parts and its principal reliance upon small volume water flow as the control medium. The invention comprises a control conduit which is mounted intermediate a main valve and a misting head in a liquid supply conduit. At one end of the control conduit a moving level liquid reservoir with float means is maintained. The float means are operatively connected to the liquid supply conduit main valve and open and close said valve, according as liquid in the reservoir falls and rises. Liquid level in the reservoir, and thus, misting liquid fed through the main valve in the supply conduit, is controlled by a misting duration valve mounted in the control conduit and a misting interval valve mounted in a drainage conduit communicant with said misting duration valve and the reservoir. The misting interval valve is externally adjustable to control drainage from the reservoir. The misting duration valve is adjustable to control liquid supplied to the reservoir. As liquid is drained from the reservoir through the drainage conduit, the float falls therein and, thus, opens the main valve in the supply conduit. Accordingly, misting liquid is fed through the main valve and misting occurs at the misting heads and continues until liquid flow through the misting duration control valve fills the reservoir and raises the float to close the main valve. Accordingly, drainage again occurs until the float is lowered to open the main valve and the cycle repeats itself. According to this invention only small amounts of water are required for control, accurate external adjustment is provided and there is instantaneous, sustained misting at each misting interval. Also, there is economy in that portions of drained water are reutilizable by means of a jetting effect of the misting duration valve. Since the drainage conduit leading to a drainage reservoir is in fluid communication with the nozzle-like misting duration valve, jetting of water through the nozzle-like misting duration valve into a reservoir creates a suction effect in the drainage conduit whereby drained water is returned from the drainage reservoir to the main reservoir.

Accordingly, it is an object of invention to provide an intermittent misting apparatus having simple control features and utilizing reduced amounts of water for control.

Another object of invention is to provide an intermittent misting apparatus which has control means independent of liquid supply conduit pressures.

Another object of invention is to provide an independent misting apparatus which has externally adjustable misting duration and misting interval control valves.

Yet additional objects of invention will become apparent from the ensuing specification and attached drawings, wherein:

FIG. 1 is a side elevation partially in section, of the instant apparatus.

In FIG. 1 main valve 10, which may be of the globe-type, is illustrated as situated in misting liquid supply conduit 50 which leads to misting head 58. Main valve 10 is opened and closed by movement of lever arm 12 which is pivoted to bracket 14 by means of pin 16. Lever arm 12 is attached at its other end to float 32 and is moved pivotally by vertical movement of weighted float 32, according as the level liquid reservoir 34 rises and falls.

Control conduit 64 leads from supply conduit 50 intermediate main valve 10 and misting head 58. Variant level reservoir 34 is mounted at the end of control conduit 64 and is supported by means of steel brace 54 or the like, which may be attached to supply conduit 50. Adjacent the connection of control conduit 64 to reservoir 34 misting duration control valve 48 is adjustably mounted. Valve 48 which may be of the globe or needle type, controls the flow of liquid through control conduit 64 and nozzle 44 to reservoir 34. Intermediate misting duration control valve 48 and the reduced diameter connection 66 of control conduit 64 to the reservoir is drainage conduit 40 which leads into drainage basin 38, having overflow 42. Mounted in drainage conduit 40 is misting interval control valve 52, which may be of the globe or needle valve type. Vertical tension bar 26 may be fastened to reservoir 34 as at 36 and includes upon its shank shoulder 60 for main valve closed position (slightly above the horizontal level of tension bar 12) and shoulder 62 for open position of main valve 10. Bracket 30 may serve as a brace for tension bar 26. As will be apparent, tension bar 12 having roller bearing 20 attached by means of bolt 22 or the like at its end is actuable vertically between shoulder 62 and shoulder 60 upon tension bar 26, according as the liquid level and thus float 32 rises and falls in reservoir 34. An adjustment feature for tension bar 26 consists of tension spring 18 interconnecting bracket 14 and tension bar 26. Tension spring 18 is adjustable by means of wing nut 24. According as tension upon roller 20 is increased, somewhat more water must be provided in reservoir 34 to lift float 32 and tension bar 12 to open main valve 10. Correspondingly, a somewhat lower level of water must be provided to permit the float to fall from shoulder 60 to 62 and thus turn off main valve 10. Shoulders 60 and 62 facilitate retaining of roller 20 into finite open and closed positions with, consequently, complete actuation of main valve 10 and sustained misting action. The instantaneous switching of main valve 10 also prevents dripping of the misting heads 58 with resultant deleterious effect upon the sand or compost under the plants. Such instantaneous control also permits facile use of the apparatus in spraying of concrete. As soon as main valve 10 is opened the workmen may step out of the way and wait only during what is full misting action and return instantly, as main valve 10 is closed. The relatively large dimensions of the float in proportion to the reservoir, as well as the features which permit reutilization of drained water, provide for great economy in water used for control purposes. It is estimated that in an apparatus of the type described, having a reservoir of 20 fluid ounces of water approximately 15 gallons of water would be utilized for control purposes during an eight hour misting operation. This is assuming that the apparatus is set for misting on a five minute cycle. It is submitted that water required for control of conventional devices under similar misting conventions would be in excess of 100 gallons.

As will be apparent misting interval control valve 52 is adjustable to permit liquid drainage from reservoir 34 at variant rates and, thus, vary the descent of float 32 in reservoir 34. When the liquid level in reservoir 34 reaches a point where it will not buoyantly support float 32, tension bar 12 rolls or drops from indentation 60 (main valve closed) to indentation 62 (main valve open) and thus opens the main valve 10. Accordingly, misting liquid is fed constantly through supply conduit 50 to misting heads 58 and through control conduit 64 past duration control valve 48 and into reservoir 34. By adjusting duration control valve 48, the rate of rise of the liquid level in reservoir 34 may be varied and correspondingly, the duration of misting is varied. Thus, float 32 is raised until lever arm 12 is urged into indentation 60 and the main valve 10 is again closed.

As will be apparent, misting duration control valve 48 and interval control valve 52 provide combinatively for fine adjustment features. The apparatus is self correcting in that if increased pressure in supply conduit 50 forces too much liquid to enter reservoir 34, then the duration of misting will be shortened. On the other hand if pressure is low in the supply conduit a correspondingly longer period will be required to fill reservoir 34 and misting will prevail during this longer period.

The location of nozzle 44 adjacent the drainage conduit effects a suction in the drainage conduit so that a portion of the water entering reservoir 34 is water which is returned from the drainage reservoir 38.

It is to be understood that the form of invention, herewith shown and described, is to be taken as a preferred example of same, and that various changes in the shape, size and arrangement of parts may be resorted to, without departing from the spirit of invention, or scope of the subjoined claims.

I claim:

1. An intermittent misting control apparatus attachable to a liquid supply conduit comprising a main valve mounted in said supply conduit; a control conduit leading from said supply conduit down stream of said valve; a reservoir attached at the end of said control conduit, a misting duration control valve mounted in said control conduit; a drainage conduit communicant with said control conduit adjacent said reservoir and having an open drainage reservoir at its end, said drainage conduit being further communicant with the lower end of said drainage reservoir; a misting interval control valve mounted in said drainage conduit; an eductor nozzle mounted in said control conduit adjacent said drainage conduit so as to apply a suction in said drainage conduit when flow takes place through said control conduit to said first named reservoir, and float means supported by liquid in said reservoir and operatively connected to said supply conduit main valve in such a manner that when said float is at one predetermined level the valve is closed and when the float is at a lower predetermined level the valve is open.

2. A misting apparatus as in claim 1, including releasable means responsive to a predetermined force for maintaining the float in either of its predetermined positions.

References Cited in the file of this patent

UNITED STATES PATENTS

| | | |
|---|---|---|
| 1,161,554 | Voigt | Nov. 23, 1915 |
| 1,822,901 | De Lacey | Sept. 15, 1931 |
| 1,921,698 | Price | Aug. 8, 1933 |
| 2,202,549 | Donaldson | May 28, 1940 |
| 2,467,951 | Whitley | Apr. 19, 1949 |